(12) United States Patent
Benco et al.

(10) Patent No.: US 7,466,808 B2
(45) Date of Patent: Dec. 16, 2008

(54) NETWORK SUPPORT FOR CALL RECORD PRIVACY

(75) Inventors: David S. Benco, Winfield, IL (US);
Kevin J. Overend, Elmhurt, IL (US);
Baoling S. Sheen, Naperville, IL (US);
Sandra L. True, St. Charles, IL (US);
Kenneth J. Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 935 days.

(21) Appl. No.: 10/999,356

(22) Filed: Nov. 30, 2004

(65) Prior Publication Data

US 2006/0115060 A1    Jun. 1, 2006

(51) Int. Cl.
*H04M 15/00* (2006.01)

(52) U.S. Cl. .................. 379/121.05; 379/119; 379/126; 455/408

(58) Field of Classification Search .................. 379/111, 379/112.01, 114.01, 114.18, 121.05, 122, 379/126, 119; 455/405, 408
See application file for complete search history.

(56) References Cited

U.S. PATENT DOCUMENTS

| 5,943,406 | A | * | 8/1999 | Leta et al. | 379/120 |
| 6,011,837 | A | * | 1/2000 | Malik | 379/114.1 |
| 6,792,089 | B2 | * | 9/2004 | Tiliks et al. | 379/126 |

* cited by examiner

*Primary Examiner*—Binh K Tieu

(57) ABSTRACT

Embodiments of the method and system provide for network support for call record privacy in a telecommunication system. The method in an embodiment may have the steps of: checking for a subscription to the call record privacy feature by a subscriber; checking if the call record privacy feature is active for a call associated with the subscriber; and marking call detail records of the call as "private" when the call record privacy feature is active. The system implements the method.

20 Claims, 4 Drawing Sheets

NETWORK SUPPORT FOR CALL RECORD PRIVACY

TECHNICAL FIELD

The present invention relates in general to telephony, and, more particularly, to a method and system that provides network support for call record privacy.

BACKGROUND OF THE INVENTION

Mobile subscribers use their mobile phones for a wide range of reasons, spanning business, family and personal purposes. In many circumstances (e.g., business security, personal privacy, etc.), mobile subscribers would like to suppress the call record details (i.e., calling or called numbers, call durations, etc.). The inadvertent or deliberate unauthorized viewing of a mobile subscriber's billing statement by a third party could be cause for the compromise of confidential information, personal or political embarrassment, etc.

Therefore, it is a drawback of the prior art that there does not exist a network solution for providing the necessary support for privacy management of a mobile subscriber's billing statement.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, an embodiment of the present method is a method for network support for call record privacy in a telecommunication system. The method in this embodiment may have the steps of: checking for a subscription to call record privacy feature by a subscriber; checking if the call record privacy feature is active for a call associated with the subscriber; and marking call detail records of the call as "private" when the call record privacy feature is active.

Also, in general terms, an embodiment of the present system is a system that provides network support for call record privacy in a telecommunication system. The system in this embodiment may have the following components: monitoring module for checking for a subscription to a call record privacy feature by a subscriber, and for checking if the call record privacy feature is active for a call associated with the subscriber; and marking module for marking call detail records of the call as "private" when the call record privacy feature is active, the marking module operatively coupled to the monitoring module.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

Typical wireless communication networks, such as those operating in accordance with the Code Division Multiple Access (CDMA) standard, generally have a plurality of radio base stations, which may be connected to a mobile switching center. Each base station covers a limited area, generally called a cell, within which a wireless communication link can be established with a mobile terminal such as a cell phone. A call in progress can be handed over from one base station to another while the mobile terminal is moving in the coverage area of the network.

Embodiments of the present method and system may provide network support for call record privacy, that is, marking for privacy the details of incoming or outgoing calls in any billing statement, whether paper or electronic, for a given mobile subscriber. Embodiments of the present method and system may be used with both wireless and wireline voice calls.

Methodologies for the network in wireless telecommunication systems may include: recognizing that a particular mobile subscriber has subscribed to the "Call Record Privacy" feature; recognizing that a particular mobile handset has activated or deactivated the "Call Record Privacy" feature; marking call detail records for certain incoming or outgoing calls as "private"; for a billing system suppressing details on the subscriber's billing statement for those call detail records marked as "private".

Figure 1:
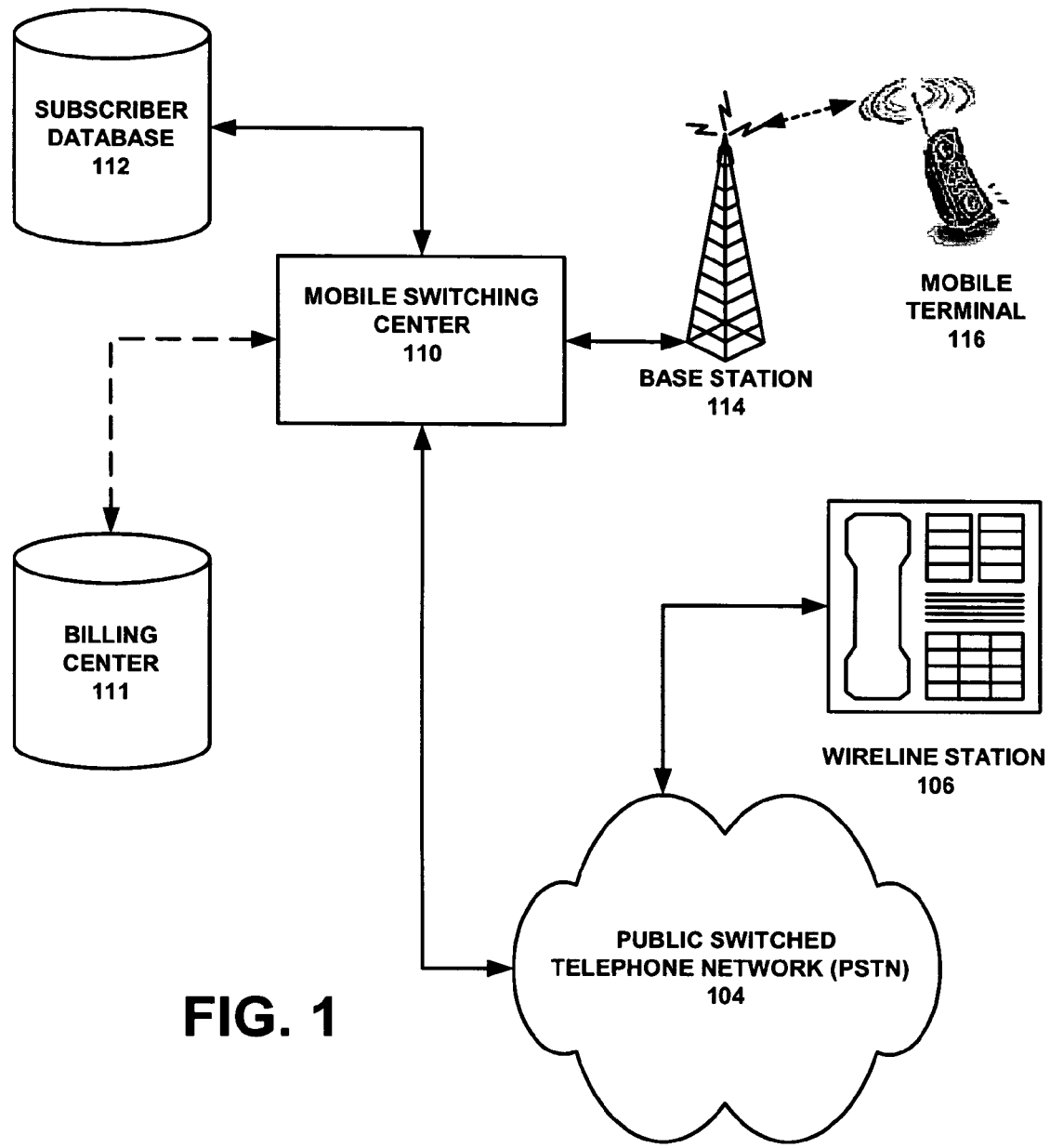
FIG. 1 depicts a block diagram illustrative of a telecommunication system for use with embodiments of the present method and system.

FIG. 1 depicts a mobile switching center 110 coupled to a base station 114, which communicates with a mobile terminal 116. Although the present system and method may be used with any type of network (wireline and wireless, for example), many subscribers may be mobile subscribers who use mobile terminals (also referred to as mobile phone, a cell phone, mobile handset, or car phone). The switching center 110 may also be coupled to a public switched telephone network (PSTN) 104 that is coupled to wireline terminals, such as wireline station 106.

A subscriber database 112 may be couple to the mobile switching center 110. The subscriber database 112 may contain data recording whether or not a calling party (also referred to as a subscriber) subscribes to the feature. The mobile switching center 110 may also be operatively coupled to a billing center 111.

In general, embodiments of the present method and system may operate as follows. The network may be aware of a mobile subscriber's subscription to the call record privacy feature by a data entry maintained in the mobile subscriber database.

The network may be aware of the current state (active or inactive) of the call record privacy feature by an entry maintained in the mobile subscriber database. For example, the feature may be activated for any one call by dialing a 2-digit prefix (e.g., *2) prior to the call. The feature may be permanently activated by dialing a different prefix (e.g., *3). The feature may be permanently de-activated by dialing yet a third prefix (e.g., *4). The call detail record for a particular call may be made visible by dialing a fourth prefix (say *6). A possible security enhancement may be to have the subscriber enter a PIN (personal identification number) before allowing any of the above call record privacy commands to be executed.

When the mobile subscriber originates a call, the dialed number may be stored by the network. Similarly, when the mobile subscriber receives a call, the calling number may be stored by the network. In each of the above cases, the calling/dialed number, call duration, etc. may be included in the call detail records for that call.

When the call record privacy feature is active, the network may mark the call detail records as "private". When the call record privacy feature is inactive or disabled, the call detail records may be forwarded to the billing system without modification.

When the billing system issues a bill for a mobile subscriber, all call detail records marked as "private" may be consolidated into a single detail-free charge on the billing statement. Charges for call records not marked as private may appear on the billing statement in the usual manner.

Figure 2:
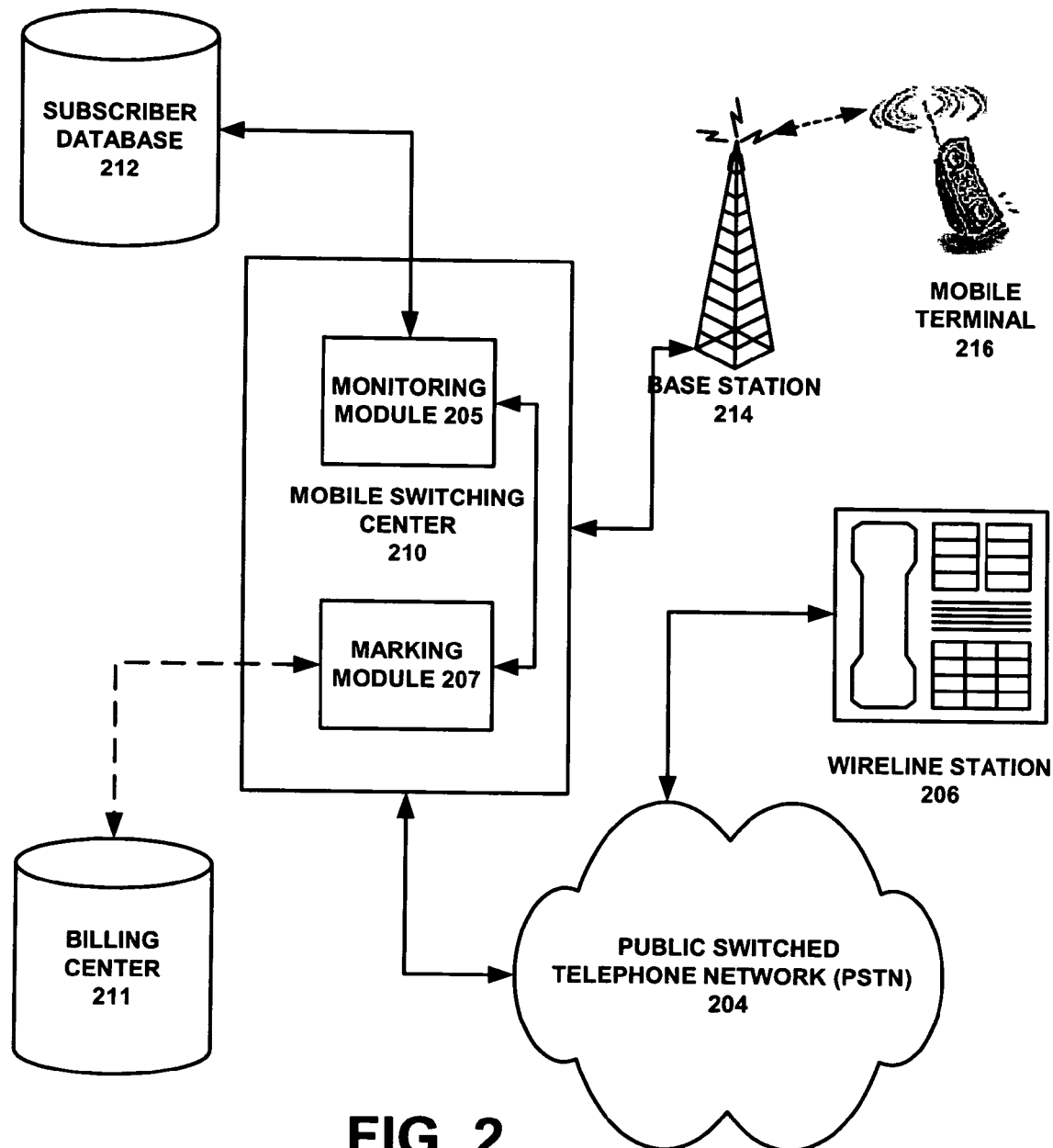
FIG. 2 illustrates a more detailed block diagram illustrative of a telecommunication system used with one embodiment of the present method and system.

FIG. 2 illustrates a more detailed block diagram illustrative of a mobile switching center 210 operatively coupled to base station 214 and mobile terminal 216 and to PSTN 204 and wireline station 206 for use by an embodiment of the present method and system. In this embodiment the mobile switching center 210 may have a monitoring module 205 for checking for a subscription to a call record privacy feature by a subscriber, and for checking if the call record privacy feature is active for a call associated with the subscriber; and marking module 207 for marking call detail records of the call as "private" when the call record privacy feature is active, the marking module 207 operatively coupled to the monitoring module 205. The monitoring module 205 may be operatively coupled to subscriber database 212, and the marking module 207 may be operatively coupled to billing database 211. The subscriber database 212 may have stored therein data regarding whether or not a party is a subscriber to the feature. FIG. 2 depicts only one embodiment that illustrates the present feature. Many other hardware and software implementations are possible.

Figure 3:
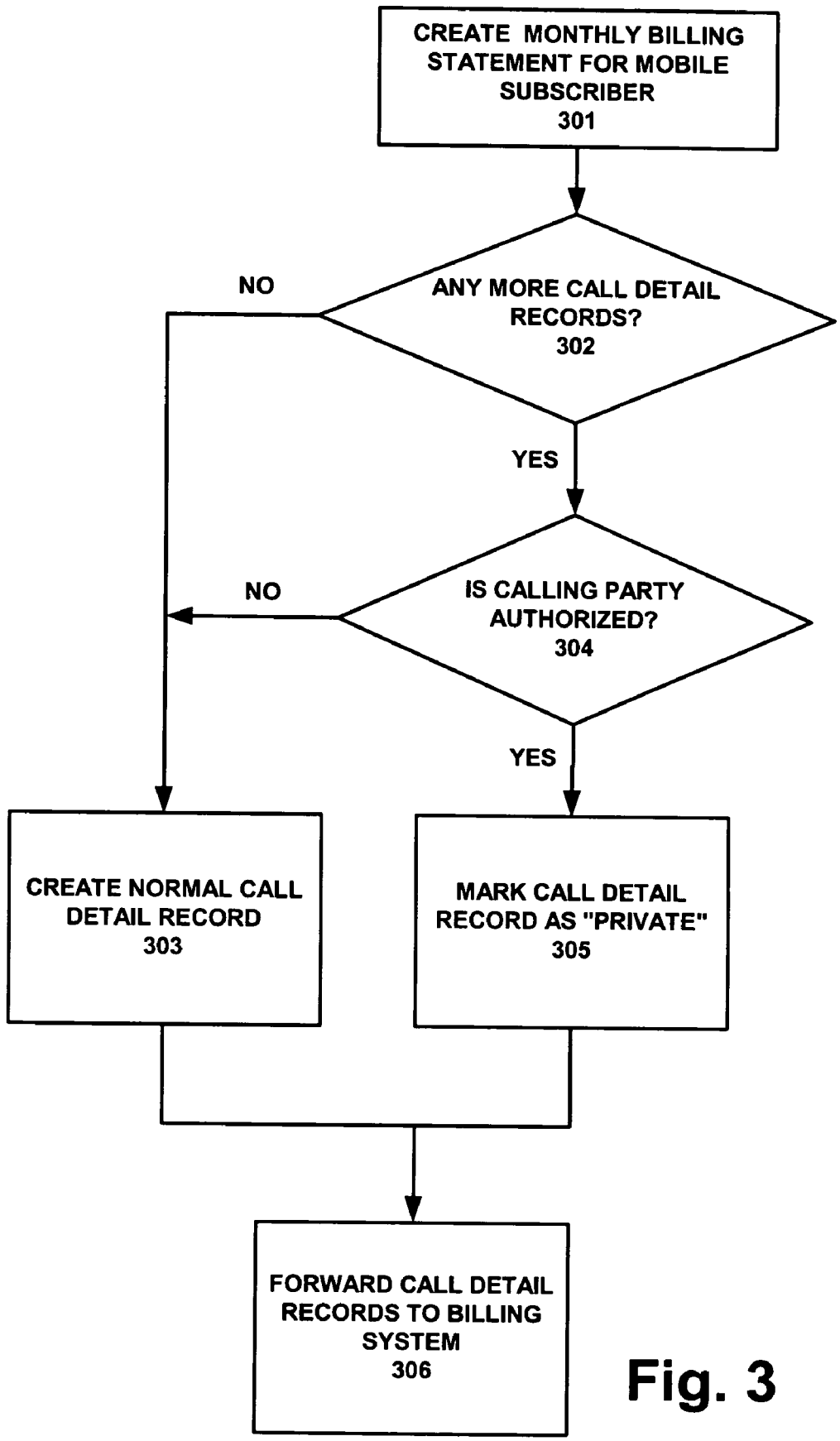
FIG. 3 illustrates a very general flow chart of logical operational steps that may be followed in accordance with one embodiment of the present method and system.

FIG. 3 is a general block diagram depicting an embodiment of the present method. In very general terms, the method may have the steps of: creating billing statement for subscriber from stored call detail records (301); checking for any more call detail records for subscriber (302); creating, if no more call detail records, normal call detail record billing statement and forwarding call detail records to a billing system (303); checking if subscriber is authorized (304); marking, if subscriber is authorized, call detail record as "private" (305); and forwarding call detail records to the billing system (306).

Figure 4:
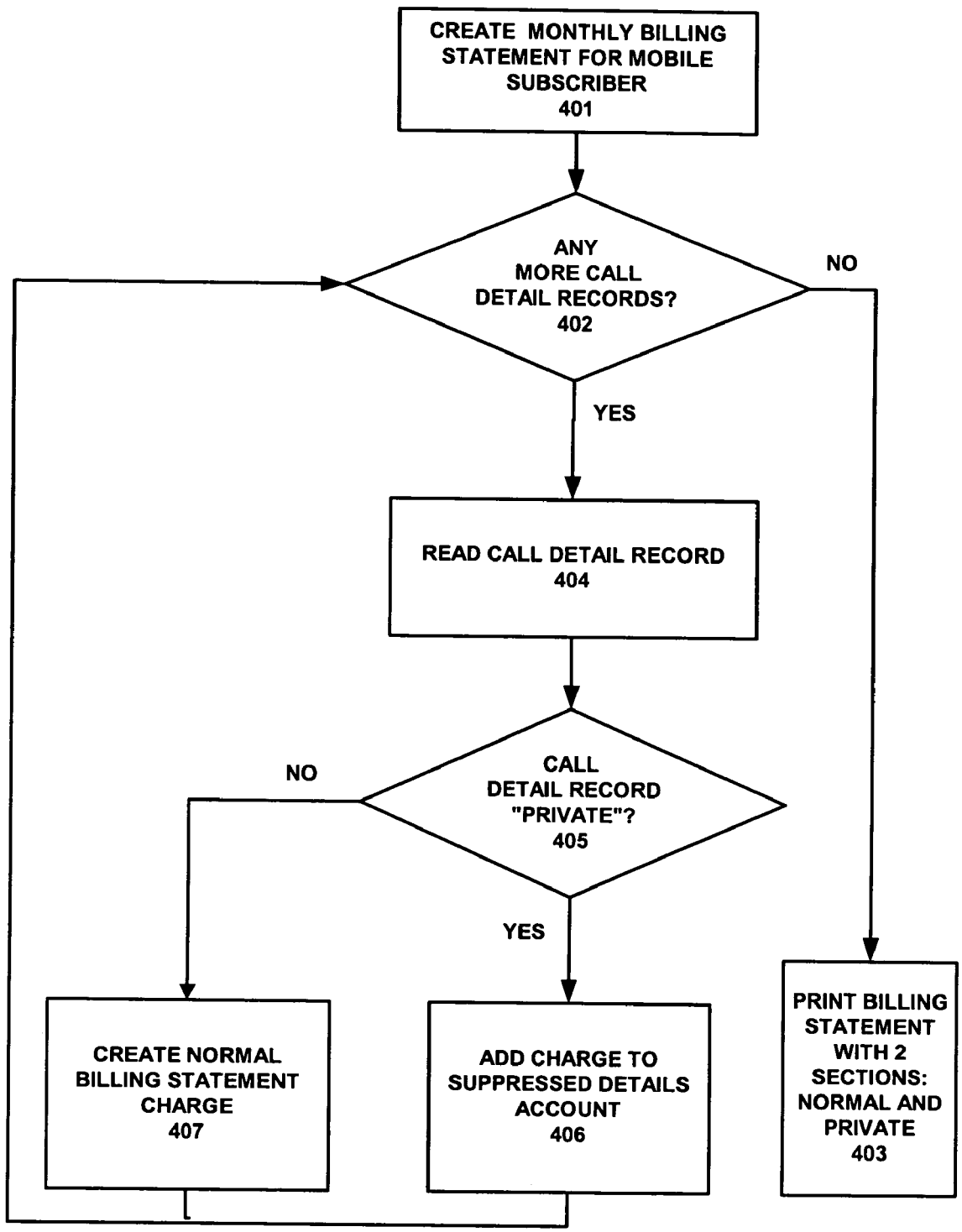
FIG. 4 illustrates another flow chart of logical operational steps that may be followed in accordance with one embodiment of the present method and system.

FIG. 4 is a block diagram depicting another embodiment of the present method. This embodiment of the method may have the steps of: creating a billing statement from call detail records for a subscriber (401); checking for more call detail records for the subscriber (402); outputting, if no more call detail records, the billing statement with a normal section and a private section (403); reading, if there are more call detail records, at least one further call detail record for the subscriber (404); checking if the at least one further call detail record is private (405); creating, if not private, normal billing statement charge, and returning to checking for more call detail records for the subscriber (407); adding, if private, charges to a suppressed details account in the billing statement, and returning to checking for more call detail records for the subscriber (406).

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for network support for call record privacy in a telecommunication system, the method comprising the steps of:
   checking for a subscription to a call record privacy feature by a subscriber;
   checking if the call record privacy feature is active for a call associated with the subscriber; and
   marking call detail records of the call as "private" when the call record privacy feature is active.

2. The method of claim 1, wherein the method further comprises, when a billing system issues a billing statement for the subscriber, the call detail records marked as "private" are consolidated into a single detail-free charge on the billing statement.

3. The method of claim 2, wherein the telecommunication system is at least one of a wireless system, a wired system and a combination system having a wireless portion and a wired portion.

4. The method of claim 3, wherein the subscriber is a mobile subscriber.

5. The method of claim 1, wherein the subscription to the call record privacy feature subscriber is stored in a subscriber database.

6. A method for network support for call record privacy in a telecommunication system, the method comprising the steps of:
   creating a billing statement for a subscriber from stored call detail records;
   checking for any more call detail records for the subscriber;
   creating, if no more call detail records, a normal call detail record billing statement;
   checking if the subscriber is authorized;
   marking, if the subscriber is authorized, call detail record as "private"; and
   forwarding call detail records to billing system.

7. The method of claim 6, wherein the telecommunication system is at least one of a wireless system, a wired system and a combination system having a wireless portion and a wired portion.

8. The method of claim 7, wherein the subscriber is a mobile subscriber.

9. The method of claim 6, wherein the subscription to the call record privacy feature subscriber is stored in a subscriber database.

10. A method for network support for call record privacy in a telecommunication system, the method comprising the steps of:

creating a billing statement from call detail records for a subscriber;
   checking for more call detail records for the subscriber;
   outputting, if no more call detail records, the billing statement with a normal section and a private section;
   reading, if there are more call detail records, at least one further call detail record for the subscriber;
   checking if the at least one further call detail record is private;
   creating, if not private, normal billing statement charge, and returning to checking for more call detail records for the subscriber;
   adding, if private, charges to a suppressed details account in the billing statement, and returning to checking for more call detail records for the subscriber.

11. The method of claim 10, wherein the telecommunication system is at least one of a wireless system, a wired system and a combination system having a wireless portion and a wired portion.

12. The method of claim 11, wherein the subscriber is a mobile subscriber.

13. The method of claim 10, wherein the subscription to the call record privacy feature subscriber is stored in a subscriber database.

14. A system for network support for call record privacy in a telecommunication system, comprising:

a monitoring module for checking for a subscription to a call record privacy feature by a subscriber, and for checking if the call record privacy feature is active for a call associated with the subscriber; and
   a marking module for marking call detail records of the call as "private" when the call record privacy feature is active, the marking module operatively coupled to the monitoring module.

15. The system of claim 14, wherein the system further comprises, when a billing system issues a billing statement for the subscriber, the call detail records marked as "private" being consolidated into a single detail-free charge on the billing statement.

16. The system of claim 14, wherein the telecommunication system is at least one of a wireless system, a wired system and a combination system having a wireless portion and a wired portion.

17. The system of claim 14, wherein the subscriber is a mobile subscriber.

18. The system of claim 14, wherein the subscription to the call record privacy feature is stored in a subscriber database.

19. The system of claim 14, wherein the monitoring module is operatively coupled to a subscriber database.

20. The system of claim 14, wherein the marking module is operatively coupled to a billing center.

* * * * *